US008215448B2

(12) United States Patent
Harting et al.

(10) Patent No.: US 8,215,448 B2
(45) Date of Patent: Jul. 10, 2012

(54) SOUND DAMPER FOR VEHICLE COMPRESSED AIR SYSTEMS

(75) Inventors: Hendrik Harting, Hameln (DE); Heinz-Werner König, Barsinghausen (DE); Thomas Müller, Hannover (DE); Karl-Heinz Riediger-Janisch, Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 12/997,306

(22) PCT Filed: Feb. 27, 2009

(86) PCT No.: PCT/EP2009/001400
§ 371 (c)(1),
(2), (4) Date: Mar. 25, 2011

(87) PCT Pub. No.: WO2009/152884
PCT Pub. Date: Dec. 23, 2009

(65) Prior Publication Data
US 2011/0168481 A1      Jul. 14, 2011

(30) Foreign Application Priority Data

Jun. 20, 2008  (DE) .......................... 10 2008 029 489

(51) Int. Cl.
*F02M 35/00* (2006.01)
(52) U.S. Cl. ........ 181/229; 181/200; 181/212; 181/230; 181/222; 181/256
(58) Field of Classification Search .................. 181/200, 181/212, 230, 222, 256, 264, 258, 270
See application file for complete search history.

(56) References Cited

U.S. PATENT DOCUMENTS

| | | | |
|---|---|---|---|
| 1,395,920 A * | 11/1921 | Libenschek | 181/264 |
| 1,821,688 A * | 9/1931 | Bourne | 181/264 |
| 1,891,170 A * | 12/1932 | Nose et al. | 60/295 |
| 1,951,813 A | 3/1934 | Watson | |
| 2,727,584 A * | 12/1955 | Marx | 181/270 |
| 2,815,088 A | 12/1957 | Gibel | |
| 2,990,907 A | 7/1961 | Everett | |
| 3,009,531 A | 11/1961 | Mead | |
| 3,243,011 A | 3/1966 | Hill | |
| 3,374,855 A | 3/1968 | Kelly et al. | |
| 3,380,553 A | 4/1968 | Gibel | |
| 3,400,784 A | 9/1968 | Thrasher | |
| 3,561,561 A | 2/1971 | Trainor | |
| 3,923,120 A | 12/1975 | Jatcko | |
| 3,949,828 A | 4/1976 | Frochaux | |
| 3,957,133 A | 5/1976 | Johnson | |
| 4,219,100 A | 8/1980 | Wyse | |
| 4,241,805 A | 12/1980 | Chance, Jr. | |

(Continued)

FOREIGN PATENT DOCUMENTS

DE      28 15 464      10/1979

(Continued)

*Primary Examiner* — Forrest M Phillips
(74) *Attorney, Agent, or Firm* — Kramer Levin Naftalis & Frankel LLP

(57) ABSTRACT

A sound damper for compressed air systems of vehicles includes a housing, an insulator and at least one web. The housing has an air inlet and an air outlet. The insulator is located in the housing, and the web is located in the housing such that it protrudes at least partially into the insulator. Air that flows through the housing from the air inlet to the air outlet is conducted by the web into the insulator.

10 Claims, 1 Drawing Sheet

U.S. PATENT DOCUMENTS

| | | | |
|---|---|---|---|
| 4,316,523 A | 2/1982 | Boretti | |
| 4,324,314 A | 4/1982 | Beach et al. | |
| 4,573,251 A | 3/1986 | Hillyard | |
| 4,628,689 A * | 12/1986 | Jourdan | 60/295 |
| 4,685,533 A | 8/1987 | Piesik | |
| 4,877,084 A | 10/1989 | Goggin | |
| 4,971,612 A | 11/1990 | Loughran | |
| 5,152,366 A * | 10/1992 | Reitz | 181/249 |
| 5,166,479 A * | 11/1992 | Gras et al. | 181/256 |
| 5,277,976 A | 1/1994 | Hogle et al. | |
| 5,452,919 A | 9/1995 | Hoyle et al. | |
| 5,467,595 A | 11/1995 | Smith | |
| 5,600,953 A | 2/1997 | Oshita et al. | |
| 5,661,973 A * | 9/1997 | Casey | 60/279 |
| 5,711,150 A | 1/1998 | Oshita et al. | |
| 5,824,972 A | 10/1998 | Butler | |
| 5,901,754 A | 5/1999 | Elsasser et al. | |
| 6,006,520 A | 12/1999 | Zehnder, II et al. | |
| 6,089,346 A | 7/2000 | Tredinnick et al. | |
| 6,109,387 A | 8/2000 | Boretti | |
| 6,209,678 B1 * | 4/2001 | Sterling | 181/230 |
| 6,343,407 B1 | 2/2002 | Muto et al. | |
| 6,520,286 B1 | 2/2003 | Frederiksen et al. | |
| 6,959,782 B2 * | 11/2005 | Brower et al. | 181/272 |
| 6,991,043 B1 * | 1/2006 | Chen | 173/169 |
| 7,261,181 B2 * | 8/2007 | Sellers et al. | 181/230 |
| 7,810,609 B2 * | 10/2010 | Sikes et al. | 181/250 |
| 2004/0023014 A1 | 2/2004 | Williamson et al. | |
| 2004/0126247 A1 | 7/2004 | Broser et al. | |
| 2004/0127129 A1 | 7/2004 | Luo et al. | |
| 2008/0289900 A1 * | 11/2008 | Christoffers et al. | 181/258 |

FOREIGN PATENT DOCUMENTS

| | | |
|---|---|---|
| DE | 29 32 777 A1 | 2/1981 |
| DE | 235 680 | 5/1986 |
| DE | 42 37 630 | 5/1994 |
| DE | 101 21 582 | 11/2002 |
| DE | 102 48 183 A1 | 4/2004 |
| DE | 20 2004 011 630 U1 | 12/2004 |
| EP | 0 019 855 A1 | 12/1980 |
| EP | 0 132 696 A2 | 2/1985 |
| EP | 0 443 431 | 8/1991 |
| EP | 0 565 136 A2 | 10/1993 |
| EP | 0 600 331 | 6/1994 |
| EP | 0 607 174 | 6/1997 |
| EP | 1 211 338 | 6/2002 |
| EP | 1 233 183 | 8/2002 |
| EP | 1 348 844 | 10/2003 |
| JP | 58202322 A * | 11/1983 |
| JP | 0 129 8210 | 12/1989 |
| JP | 0 527 9911 | 10/1993 |
| JP | 2001105353 | 4/2001 |
| WO | 0026074 | 5/2000 |
| WO | WO 02/00973 | 1/2002 |

* cited by examiner

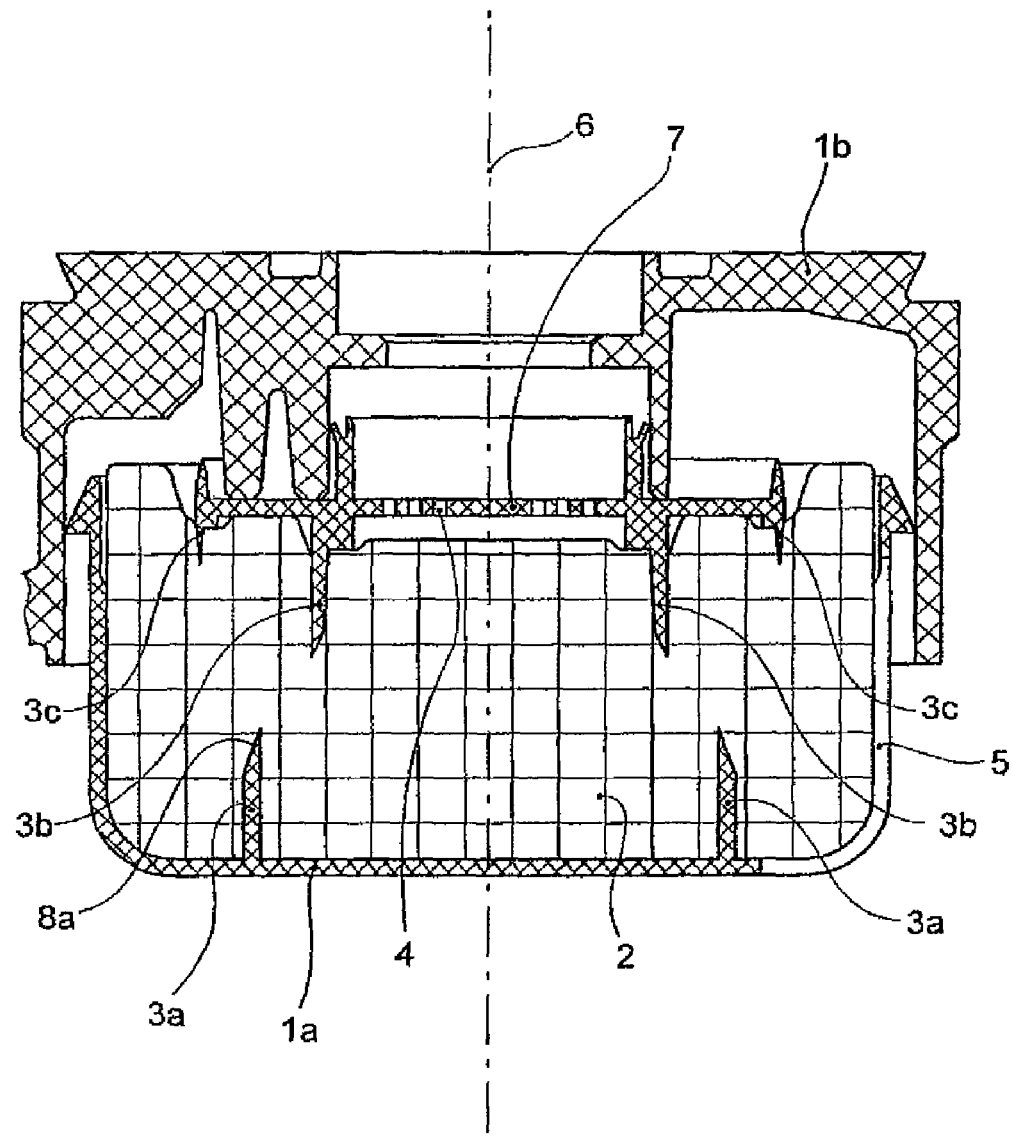

SOUND DAMPER FOR VEHICLE COMPRESSED AIR SYSTEMS

FIELD OF THE INVENTION

The present invention generally relates to embodiments of a sound damper for a vehicle compressed air system that includes a housing and an insulator arranged inside the housing.

BACKGROUND OF THE INVENTION

Sound dampers of the general type under consideration are suitable particularly for use in venting the vehicle compressed air system to damp the noises generated when the compressed air system is being vented.

Sound dampers of this general type are disclosed, for example, in DE 102 48 183 A1 and DE 20 2004 011 630 U1.

A disadvantage of known sound dampers of this type is that there is the possibility that at least part of the airstream flows past the insulator or flows under it, with the result that the damping properties of the sound damper are reduced.

SUMMARY OF THE INVENTION

Generally speaking, it is an object of the present invention to provide a sound damper that ensures effective conduction of the airstream through the insulator of the sound damper.

In accordance with embodiments of the present invention, the sound damper includes a housing, an insulator and one or more webs. The housing has an air inlet and an air outlet. The insulator is arranged inside the housing. The web is arranged inside the housing such that it projects at least partially into the insulator, and air that flows from the air inlet to the air outlet through the housing is conducted into the insulator by the web.

The term "projects" is to be understood in this context to mean that, at least in the portion in which the web extends into the insulator, the insulator is adjacent on both sides to the opposite side faces of the web. Preferably, the entire outer face of that portion of the web that projects into the insulator is adjacent to the insulator.

The web ensures that the airstream flows through the insulator as effectively as possible. In particular, the web ensures that part of the airstream does not flow under the insulator. The form of the web, in particular the height and/or diameter, may vary, depending on the set-up of the sound damper.

Preferably, the web is formed in one piece with the housing. For example, the housing may include a cover and a bottom with the web being integrally formed on the bottom and/or on the cover. Other forms of a one-piece construction are also contemplated. Forming the web in one piece with the housing is preferred since it is cost-effective.

Preferably, a first web surrounds the air inlet and/or a second web surrounds the air outlet.

By means of an arrangement of this type, the air, on its way from the inlet to the outlet, has to flow around the first web and/or the second web. The airstream is thus conducted effectively into the insulator. It is also possible that the inlet and outlet are surrounded by a web in regions only, so that only part of the airstream is routed by the web.

Preferably, the housing and the web are designed to be radially symmetrical about a common axis. Other forms are also contemplated, in particular oval or rectangular forms.

Preferably, the insulator contains a knitted roll composed of a knit material wound about an axis. It should be understood that other insulators can also be used. In particular, a plurality of insulating materials may be provided.

Preferably, the knitted roll and the web are arranged so as to run parallel to one another. This makes it easier to arrange the web and knitted roll, in particular to carry out mounting, since the web can press one or more rings of the knitted roll away or together. Preferably, all the webs run parallel in this way. It is also preferred that the web, the housing and the knitted roll are arranged along a common axis of symmetry, the web and housing being designed to be radially symmetrical. This makes it possible to have a highly compact form of the sound damper.

Preferably, the web tapers at its end projecting into the insulator. This makes it easier to introduce the web into the insulator during mounting. However, other forms are also possible, for example a rounded, serrated, straight or wavy form.

Preferably, the web has, in the region of its end projecting into the insulator, one or more emergency passages for the passage of air. Emergency passages of this type are formed preferably by geometric orifices on the web edge, the orifices being formed such that, if the sound damper is iced up, these are broken out by being subjected to a dynamic pressure and a channel for the airstream is thus opened up.

Preferably, the air outlet comprises at least one venting slot. A multiplicity of narrow elongate venting slots can be provided, particularly in order to allow rapid venting.

Preferably, the sound damper has a screen element arranged in the region of the air inlet. A screen element of this type serves to throttle the airstream prior to entry into the insulator. This screen element may be an element independent of the housing or else is formed in one piece or in one part with the housing.

The housing, web and screen element are preferably composed of plastic. However, other materials can also be used, for example metal, in particular aluminum, or else even combinations of materials.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWINGS

The invention is explained in more detail below with reference to the appended drawing of an exemplary embodiment, in which:

FIG. 1 is partial cut away view of a sound damper in accordance with an exemplary embodiment of the present invention.

DETAILED DESCRIPTION OF THE PREFERRED EMBODIMENTS

FIG. 1 shows a partially cut away sound damper according to an exemplary embodiment of the invention for compressed air systems of vehicles. In this case, the sound damper is arranged in the venting of the compressed air system in order to damp the venting noise when the compressed air system is being vented.

The sound damper comprises a housing, an insulator 2 and three webs 3a, 3b, 3c. The housing is constructed in two parts from a cover 1a and a bottom 1b. Located in the bottom 1b is an air inlet 4 and in the cover 1a an air outlet 5.

The insulator 2 is arranged inside the housing 1a, 1b. The three webs 3a, 3b, 3c are arranged inside the housing 1a, 1b such that they project into the insulator, and air flowing from the air inlet to the air outlet through the housing 1a, 1b is conducted into the insulator by the webs 3a, 3b, 3c.

The webs 3a, 3b, 3c are formed in one piece with the housing 1a, 1b. Here, the web 3a is formed in one part with the cover 1a and the webs 3b and 3c are formed in one part with the bottom 1b.

The housing 1a, 1b and the webs 3a, 3b, 3c are designed to be radially symmetrical about a common axis of symmetry 6. The cover 1a of the housing has essentially the form of a pot, and the bottom 1b of the housing is essentially planar. The air inlet 4 is formed as a circular orifice, likewise with the axis 6 as an axis of symmetry, in the bottom 1b. Alternatively, the air inlet 4 can also be designed to be offset with respect to the axis 6. This circular orifice is completely surrounded at its margin by the annular second web 3b, which projects into the interior of the housing.

The air outlet 5 is formed by a multiplicity of narrow elongate venting slots arranged so as to run radially with respect to the axis of symmetry 6 and which commence in the marginal region of the bottom of the housing cover 1a and extend over a large part of the cover outer face. The venting slots are completely surrounded radially by the first web 3a, and the web 3a is designed as a ring on the bottom of the housing cover 1a adjacent to the start of the venting slots and projecting into the housing interior.

The third web 3c is formed at the margin of the housing cover 1b, the diameter of which is somewhat smaller than the inside diameter of the housing cover 1a. The third web 3c likewise projects into the housing interior.

The air inlet 4 is covered completely by a screen element 7. This screen element 7 has a multiplicity of circular continuous orifices. The purpose is to throttle the airstream of the compressed air system during venting. The sound damper is connected to the venting of the compressed air system via the screen element 7. It is likewise possible to design the sound damper without a screen element.

The insulator 2 is a knitted roll composed of a knit material wound about an axis and comprising thermoplastic threads. Alternatively, in particular, metal can also be a possible material. The knitted roll 2 and the webs 3a, 3b, 3c are arranged so as to run parallel to one another, the axis 6 therefore being a common axis of symmetry.

The webs 3a, 3b, 3c are tapered at their ends projecting into the insulator 2 (see, for example, the end 8a). Furthermore, the webs 3a, 3b, 3c have, at the edges of the ends projecting into the insulator 2, a plurality of emergency passages for the passage of air.

The diameter of the second web 3b designed to be radially symmetrical is somewhat smaller than the diameter of the first web 3a designed to be radially symmetrical. The first web 3a and second web 3b in this case project deeply into the insulator 2, but do not overlap one another in height. This arrangement of the first web 3a and of the second web 3b forces an airstream to flow around the second web 3b, pass through the narrow passage between the ends of the first web 3a and of the second web 3b and flow around the first web 3a in order to pass from the air inlet 4 to the air outlet 5. This has the effect that an airstream is conducted effectively through the insulator 2. The third web 3c, which has a diameter larger than the diameter of the annular web 3a, contributes to conducting the airstream through the insulator 2 in the direction of the venting slots forming the outlet 5.

The housings 1a, 1b, webs 3a, 3b, 3c and screen element 7 can be produced from plastic, in this case from polyamide.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A sound damper for a vehicle compressed air system, comprising:
    a housing comprising an air inlet and an air outlet;
    an insulator arranged inside the housing; and
    a first web arranged inside the housing to surround the air inlet, project at least partially into the insulator, and conduct air flowing from the air inlet to the air outlet through the housing into the insulator.

2. The sound damper as claimed in claim 1, wherein the first web is formed in one piece with the housing.

3. The sound damper as claimed in claim 1, further comprising a second web surrounding the air outlet.

4. The sound damper as claimed in claim 3, wherein a third web is formed concentrically about the first web.

5. The sound damper as claimed in claim 1, wherein the insulator includes a knitted roll having a knit material wound about an axis.

6. The sound damper as claimed in claim 5, wherein the knitted roll and the first web are parallel to one another.

7. The sound damper as claimed in claim 1, wherein the first web tapers at an end projecting into the insulator.

8. The sound damper as claimed in claim 1, wherein the first web has, in the region of an end projecting into the insulator, at least one emergency passage for the passage of air.

9. The sound damper as claimed in claim 1, wherein the air outlet includes at least one venting slot.

10. The sound damper as claimed in claim 1, further comprising a screen element arranged in the region of the air inlet.

* * * * *